United States Patent [19]
Bois et al.

[11] Patent Number: 4,767,126
[45] Date of Patent: Aug. 30, 1988

[54] MOTOR VEHICLE WITH A PNEUMATIC LEVELING UNIT

[76] Inventors: Wilhelm Bois, Schulstr. 2, 8074 Gaimersheim; Georg Sterler, Mozartstr. 20, 8071 Grobmehring; Martin Dengler, Waldweg 3, 8079 Tauberfeld, all of Fed. Rep. of Germany

[21] Appl. No.: 3,522

[22] Filed: Jan. 15, 1987

[30] Foreign Application Priority Data

Jan. 17, 1986 [DE] Fed. Rep. of Germany ....... 3601176

[51] Int. Cl.$^4$ ............................................. B62D 37/00
[52] U.S. Cl. ............................. 280/6 R; 280/DIG. 1
[58] Field of Search ................. 280/6 R, 6.1, DIG. 1; 180/141

[56] References Cited

U.S. PATENT DOCUMENTS

| 2,882,068 | 4/1959 | Faiver | 280/DIG. 1 |
| 2,925,284 | 2/1960 | Szostak et al. | 280/DIG. 1 |
| 2,950,124 | 8/1960 | Pribonic | 280/DIG. 1 |

FOREIGN PATENT DOCUMENTS 148712  8/1985  Japan .................................. 280/6.1

*Primary Examiner*—Ross Weaver
*Attorney, Agent, or Firm*—Reed, Smith, Shaw & McClay

[57] ABSTRACT

A motor vehicle with a pneumatic leveling unit and an electrically operated compressor associated with the leveling unit which is energized only under specific pre-conditions, and with a trunk compartment with trunk lid, wherein the compressor is energized by the opening of the trunk lid, with the internal combustion engine not running, when a minimum level limit value is reached or exceeded.

7 Claims, 2 Drawing Sheets

MOTOR VEHICLE WITH A PNEUMATIC LEVELING UNIT

BACKGROUND AND DISCUSSION OF THE INVENTION

The invention relates to a motor vehicle with a pneumatic leveling unit operated by a compressor to control the level of vehicle under varying loads. The loading unit is located between the axle and the chassis of the vehicle and under the action of compressed air can be operated to change the distance between the chassis and axle to maintain a desired level.

It is not desirable for the pneumatic leveling unit to be de-activated when the vehicle is not in operation. Otherwise, the vehicle may, when loaded, subside until it comes to rest on the rubber cushions. This results in poor riding comfort on starting out until the desired level position has been reached after the vehicle has started out and the compressor has been activated.

On the other hand, constant supply of voltage to the compressor by the battery is questionable, inasmuch as this can result in premature depletion of the battery.

One object of the invention is to assure adequate riding comfort in the start-up phase of the vehicle with a series-produced motor vehicle without unduly draining the battery charge.

This is accomplished in the invention by using a system where the compressor undertakes to raise the vehicle above a minimum level limit only when the trunk compartment is opened. Thus, when the engine is not running there would be no drain on the battery until the trunk lid is moved to an open position. The battery would then provide sufficient power until the trunk lid is closed or the desired minimum level is reached.

Inhibition of the undesirable condition in which loading of the trunk compartment, in particular, leads to extreme subsidence of the rear of the motor vehicle until it comes to rest on the rear rubber cushions is to be regarded as an advantage of the invention. Only as a result of entry of passengers is a vehicle loaded in such a way that the load is distributed to some extent equally between the two axles, so that such abrupt subsidence is not to be feared. Hence compressor operation is permitted for a limited time, against the event that a minimum level limit has been reached or exceeded.

It is provided in a preferred embodiment of the invention that opening of the trunk lid is sensed by the trunk switch monitor which activates the trunk light. This switch can be used simultaneously for sensing an open trunk and corresponding actuation of the compressor.

In one embodiment the compressor remains constantly actuated as long as the trunk is open. A somewhat more expensive alternative provides that when the trunk is opened, the compressor may be activated only for a prescribed period of time determined by a time function element which is installed in an electronic system. When the trunk is opened and this latter system switches the compressor off after a specific period, regardless of whether the trunk is open or closed.

DETAILED DESCRIPTION OF THE PREFERRED EMBODIMENT

Figure 1:
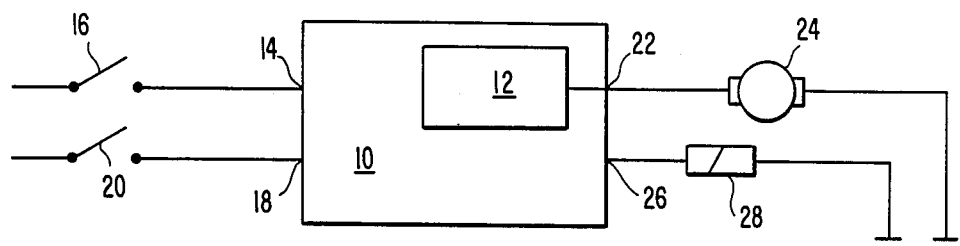
FIG. 1 is a block diagram of one embodiment of the invention.

In FIG. 1, an electronic module 10 contains a time function element 12. A signal is introduced into the input 14 of the electronic module 10 if a switch 16, actuated by the opening and shutting of the trunk, is closed. As has been stated, switch 16 may be the trunk compartment light switch.

A signal is introduced into another input 18 of the electronic module 10 by way of a switch 20 actuating a level sensor that informs the electronic module if a presettable command value has not been reached or has been exceeded.

One output 22 to the electronic module 10 actuates an electric motor 24 which provides for compressor operation, while a second output 26 actuates a release valve 28 which serves to lower the vehicle and which is not further discussed here.

The leads supplying the electronic module 10 with voltage have been omitted for the sake of simplicity.

If the internal combustion engine of the motor vehicle is now started, the electronic module 10 actuates the compressor 24 in all cases, the time function element 12 being bypassed if so desired, and it is made certain that the vehicle will retain its assigned level position.

To avoid the need for continual adjustment of the assigned level velue when the internal combustion engine is not running, which adjustment would drain the battery, the compressor 24 is not energized under these operating conditions.

However, this can lead to subsidence of the rear of the vehicle to such an extent when the trunk is loaded that the vehicle comes to rest on the rubber cushions, this leading, when the vehicle starts out, to very noticeable impairment of riding comfort until the assigned level position has been reached. In order not to drain the battery needlessly, and again not to detract from start-up comfort, switch 16 is provided, this switch being closed when the trunk is opened. If switch 20 is closed at the same time, that is, if the assigned level position has not been reached, the compressor 24 is actuated by way of electronic module 10 and delivers pneumatic pressure to lift the vehicle in the desired direction to its assigned level. To avoid excessive battery drainage with the trunk constantly open, a time function element 12 may also be incorporated in the electronic module, said time function element being activated when switch 16 is closed and actuating the compressor 24 only for a period determined by the time function element.

If the vehicle is to be lowered, for example, because the trunk has been emptied, the release valve 28 is operated by a known method by way of the electronic module 10.

Figure 2:
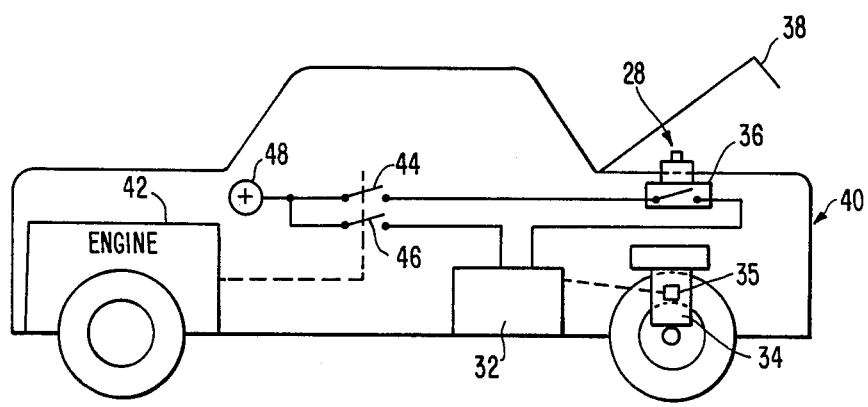
FIG. 2 is a schematic of a vehicle incorporating the invention.

With reference to FIG. 2, a schematic of a motor vehicle 30 is shown with various elements of the invention. Compressor 32 is located in the bottom portion of vehicle 30 between front and rear wheels and behind the engine 42. Trunk lid 38 cooperates with the remaining portions of the vehicle 30 to close or open the trunk 40.

Leveling unit 34 includes a sensor 35 shown directly coupled to the compressor although it could be coupled through the controller or some other unit which operates the compressor depending on the signal received from the sensor.

Rather than an electronic controller, there are shown two switches 44 and 46 connected in parallel to power source 48 which ultimately delivers current to compressor 32 depending on the position of trunk lid 38 and operation of the engine 42. In the embodiment as shown, when the engine is running, upper switch 44 will be open and lower switch will be closed. In this position, current will be delivered directly from the source 48 to compressor 32 without passing through trunk switch 36. When the engine is stopped, the upper switch 44 will be moved to a closed position and the lower switch 46 will be opened. In this configuration, the current must pass through switch 36 before the compressor 32 will be operated. When the lid 38 is moved to an upward or open position, the switch 36 is closed closing the circuit between the door 48 and the compressor 32. In this position, the compressor will be operated to move the leveling unit as described above if necessary, depending on the minimum sense value by the sensor.

Figure 3:
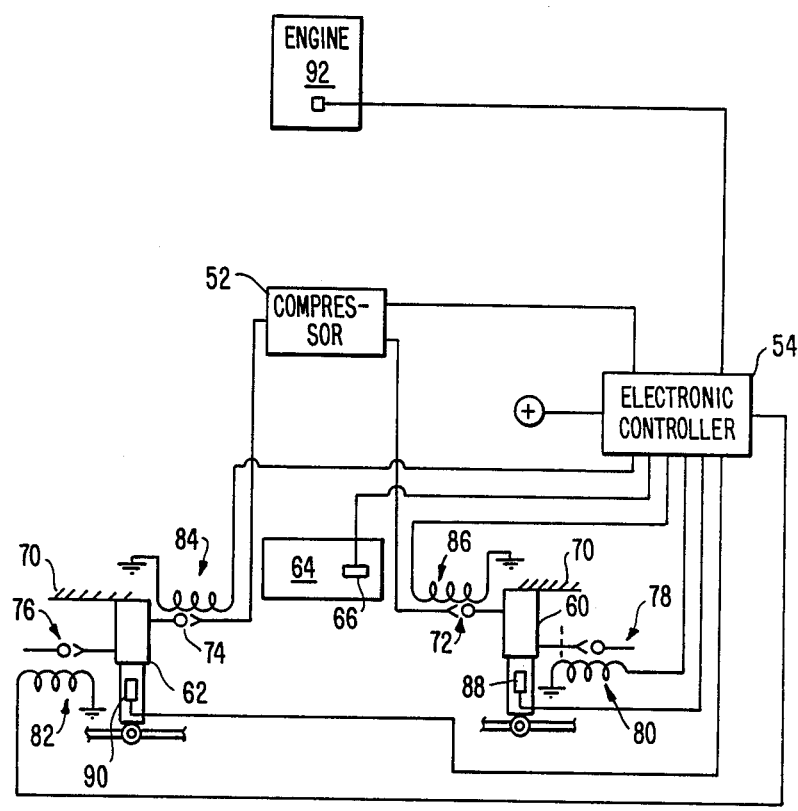
FIG. 3 is a schematic of another embodiment of the invention.

A more detailed arrangement showing the interaction of the controller with the other elements of the system is shown in FIG. 3. Here it can be seen that electrical connections are made through an electronic controller 54 to various elements throughout the system. In this system, two leveling units 60, and 62 are shown located adjacent rear wheels 56, 58 respectively of the vehicle and between the chassis 70 and rear axle 71 to control the distance between these two elements depending on the volume of pressurized air delivered to and the load on the unit. Each unit 60, 62 has an intake valve 84, 86 respectively connected to compressor 52 permitting compressed air to enter into a unit and compensate for exceeding the minimum value. Exhaust valves 80 and 82 are also provided for each unit 60, 62 respectively permitting compressed air to exit the unit where the weight has been removed from the vehicle and to compensate for the minimum value being exceeded in the opposite direction air is exhausted from the unit.

More specifically, the compressor 52 is connected to leveling unit 60 through intake valve 72 which is operated by solenoid 86 to move valve 72 between open and closed positions. Solenoid 86 is connected between ground and the electronic controller 54. Similarly, unit 62 has an intake valve 74 movable between an open and closed position connected to the compressor 52. The intake valve 74 is controlled by solenoid 84 which is electrically connected to the controller 54. Each of the units 60 and 62 also include their respective exhaust valve 78 and 76, both of which are operated by the respective solenoids 80 and 82, the latter electrically connected to controller 54. Sensors 88 and 90 are electrically connected through controller 54 to sense the position of its respective leveling unit and ultimately the position of the chassis with respect to the rear axle. It should also be noted that a trunk sensor 66 senses the position of the trunk lid 38, as shown in FIG. 2, with respect to the trunk 64. This sensor 66 is electrically connected to the electronic controller 54. Similarly, the engine has a sensing mechanism 24 electrically connected to the electronic controller 54 to sense whether the engine 52 is running or not.

With this system, the electronic controller controls the operation of the compressor and various valves depending on the position of the chassis relative to the rear axle. The electronic controller 54 energizes the compressor 52 when the trunk sensor 66 sense the trunk lid in the open position. However, pressurized air will not be delivered to the units unless either one of the sensor 88 and 90 provide a signal which indicates that a preselected minimum value has been exceeded. That is, that the chassis has been moved by the weight of material placed in the trunk unacceptably close to the rear axle. Once such a position has been sensed, the electronic controller will open the necessary valve 72, 74 by generating a signal to solenoid 86 and 90 to move the valves to the open position. Once the leveling unit has returned the chassis to the proper position relative to the axle, this will be sensed by sensors 88 and 90 and an electrical signal to the controller will result in the controller 54 providing a corresponding signal to solenoids 86 and 90 de-energizing the solenoids and allowing the valves 72 and 74 to close. During this entire operation the compressor will remain actuated until the trunk lid is closed. When that occurs, electronic controller 54 will receive a signal from the trunk sensor 66 causing the controller to deliver a corresponding signal to the compressor 52 to de-energize the compressor. The controller cooperates with the engine sensor 92 such that only when the engine is not running will the trunk sensor come in to operation. If the engine is running, the trunk sensor will be by-passed as has been shown schematically in FIG. 2.

With this system, the operation is as follows. When the engine is not running and a person is loading the car with groceries and other materials, typically there will be compensation for the effect of the load on the leveling unit. If some compensation is not otherwise made before any other system can be utilized, it can create an unstable and uncomfortable ride for persons in the car. With this system, once the trunk lid 38 is opened, this is sensed by the electronic controller which places the compressor in an on position. As load is placed in the trunk, and the preselected minimum position is exceeded, this is sensed by the sensors 88 and 90 which provide the corresponding electrical signal to the controller. As a result, the electronic controller emits a corresponding signal to solenoids 86 and 90 to drive the intake valves 72 and 74 to an open position. This permits the compressed air to enter the leveling units and compensate for depression of this unit as a result of the load. These valves will remain open until the load is fully compensated for and they are moved back to the preselected position. Once this position has been achieved, this is sensed by sensors 88 and 90 with corresponding signals being returned to the electronic controller which in turn delivers an electrial signal to solenoids 86 and 82 to de-energizing these solenoids allowing the air intake valve 72 and 74 to close.

Once the trunk lid is then closed, this is sensed by the electronic controller 54 and the compressor 52 is de-energized. The user can then return to the vehicle and drive away in comfort.

Once having reached destination, the trunk may then be unloaded with the engine in the off position. As goods are removed from the trunk the load can be removed causing the leveling unit to fall short of the preselected value. Under these conditions the chassis and the axle are moved farther apart than is desired. This movement is sensed by unit sensors 88 and 90 and the appropriate signal reaches the electronic controller 54 which generates the appropriate signal to solenoids 80 and 82 to drive the exhaust valves in open position. In this position the pressurized air is removed from the units until they retract to the preselected position. Once the preselected position has been reached so sensed, the electronic controller will de-energize the solenoids allowing the exhaust valves to return to the closed disposition. Once the trunk lid is closed the entire system is de-activated, the compressor de-energized, permitting the driver and passengers to drive away in relative comfort.

It should be understood that a controller for this purpose presently exists in the marketplace. They can be purchased off the shelf and programmed to accomplish the results as discussed above. Consequently, detailed discussion of the operation of the controller is not required.

The above has been a discussion of the preferred embodiments. The broadest scope of the invention is defined in the claims which follow and is intended to include all equivalents consistent with the advancement over the prior art. The discussion of the preferred embodiments should not be interpreted to unduly narrow the scope of the invention to which applicant is entitled.

What is claimed:

1. A motor vehicle comprising:
   an internal combustion engine for providing power to said vehicle;
   a pneumatic leveling unit;
   an electrically operated compressor for energizing the leveling unit;
   a trunk compartment with trunk lid;
   a controller for controlling the operation of the compressor;
   a trunk switch operable by said trunk lid;
   said controller being electrically connected to said switch, said controller operating said compressor upon actuation of said trunk switch with the internal combustion engine not running and when a minimum level limit value is reached or exceeded, said controller operating said compressor so long as the trunk lid is open and the minimum limit value has not been exceeded.

2. A motor vehicle as claimed in claim 1, further comprising a light switch which is associated with the trunk compartment and corresponding to said trunk switch movable between an on and off position when the trunk lid is opened and closed respectively.

3. A motor vehicle comprising:
   an internal combustion engine for providing power to the vehicle;
   an electrical power source when said engine is not running;
   a front axle and a rear axle, a chassis connected to said axles;
   at least one first pneumatic leveling unit connected between the rear axle and the chassis;
   an electrically operated compressor for delivering air pressure to said first leveling unit;
   a first air intake valve for admitting air to said leveling unit, electrically operable means for moving said first intake valve between and open and closed position;
   a first exhaust valve, an electrically operable means for moving said exhaust valve between an open and closed position;
   said compressor being connected to said leveling unit through said intake valve;
   a trunk with a trunk lid movable between an open and a closed position;
   a trunk sensor for sensing the position of said trunk lid;
   a first leveling unit sensor connected to said first leveling unit for sensing the minimum position of said chassis relative to said rear axle;
   an engine sensor for sensing whether the engine is running;
   a controler electrically connected with said engine sensor, said first leveling unit sensor, said electrically operable means for said first exhaust valve, said electrically operable means for said first intake valve, and said trunk sensor, said source of electrical power and said compressor to energize said compressor, actuate said first intake valve to an open position and said first exhaust valve to a closed position when said engine is not running, said trunk when lid is in an open position and said leveling unit is below said minimum position;
   said controller de-energizing said electrically operable means for said first intake valve to a closed position when said leveling unit is equal to or above said minimum position; and
   a timing circuit for energizing said compressor for a pre-selected period of time when said engine is not running.

4. The vehicle according to claim 3 further comprising a light switch for activating a light in said trunk, wherein said trunk switch also acts as said light switch.

5. The vehicle according to claim 4 wherein said controller activates said compressor so long as the trunk lid is open and said first leveling unit is below said minimum value.

6. The vehicle according to claim 5 further comprising a first rear wheel and a second rear wheel, a second leveling unit, said first leveling unit being located adjacent to the first wheel and said second leveling unit being located adjacent said second wheel, said second leveling unit being connected between the rear axle and the chassis for controlling the position of the chassis relative to the rear axle, a second leveling unit sensor connected to said second leveling unit; a second exhaust valve, electrically operable means between an open and closed position on said second leveling unit and a second exhaust valve, electrically operable means for moving the said second exhaust valve between an open and closed position; said controller cooperating with said leveling sensors, said electrically operable means for said exhaust valves, said electrically operable means for said intake valves to actuate said air intake valves to an open position and said exhaust valves to a closed position when said engine is not running and said trunk lid is in an open position, said leveling units being below said minimum value, said controller de-energizing said electrically operable intake valve means to close position when said leveling units are above said minimum value.

7. A method for controlling the position of a chassis of a motor vehicle with respect to its rear axle comprising:
   arranging at least one leveling unit between the chassis and the axle, said leveling unit being pneumatically operated;
   selecting a minimal level below which the chassis should not move relative to said axle;
   sensing the position of the chassis with respect to the axle;
   compressing air for delivery to said leveling unit;

delivering to said leveling unit the compressed air to maintain the unit in a position at or above the preselected minimum level;

sensing the position of a trunk lid with respect to the trunk and sensing whether the engine is running; and said compressing step being accomplished only when the trunk lid is in the open position and said delivery step occurring only when said sensing step senses that the preselected minimum level has been exceeded;

said sensing steps being accomplished by sending electrical signals to a controller;

said compressing steps including an electrically operated compressor operated according to said sensing steps wherein said compression step does not take place unless the engine is not running and the trunk lid is in the open position; and said compression step taking place for a preselected time period.

* * * * *